(12) United States Patent
Fraser et al.

(10) Patent No.: US 8,655,735 B2
(45) Date of Patent: *Feb. 18, 2014

(54) TRANSFERRING AN ITEM

(75) Inventors: Stuart A. Fraser, Armonk, NY (US); Philip Myron Ginsberg, Skippack, PA (US); Glenn D. Kirwin, Scarsdale, NY (US); Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 1319 days.

This patent is subject to a terminal disclaimer.

(21) Appl. No.: 11/680,690

(22) Filed: Mar. 1, 2007

(65) Prior Publication Data
US 2007/0143193 A1    Jun. 21, 2007

Related U.S. Application Data

(63) Continuation of application No. 09/670,900, filed on Sep. 28, 2000, now Pat. No. 7,574,375.

(60) Provisional application No. 60/156,474, filed on Sep. 28, 1999.

(51) Int. Cl.
*G06Q 30/00* (2012.01)

(52) U.S. Cl.
USPC ............................ 705/26.1; 705/27.1; 705/37

(58) Field of Classification Search
USPC ........................................ 705/26.1, 27.1, 37
See application file for complete search history.

(56) References Cited

U.S. PATENT DOCUMENTS

| | | | |
|---|---|---|---|
| 5,136,501 A | 8/1992 | Silverman et al. |
| 5,621,797 A | 4/1997 | Rosen |
| 5,640,569 A | 6/1997 | Miller et al. |
| 5,677,955 A | 10/1997 | Doggett et al. |
| 5,710,887 A | 1/1998 | Chelliah et al. |
| 5,717,989 A | 2/1998 | Tozzoli et al. |
| 5,794,219 A | 8/1998 | Brown |
| 5,835,896 A | 11/1998 | Fisher et al. |

(Continued)

FOREIGN PATENT DOCUMENTS

| | | |
|---|---|---|
| EP | 0987644 A2 | 3/2000 |
| JP | 2002-74076 | 3/2002 |

(Continued)

OTHER PUBLICATIONS

Briley, John, Travel Insider; Navigating Through the Maze of Air Fare Bargains; Discounts: As ticket consolidators go head-to-head with online agents and other cut-rate brokers, the watchword is caveat emptor.; [Home Edition], Los Angeles Times. Los Angeles, Calif.: Jul 4, 1999. p. 2, downloaded from ProQuestDirect on the Internet on Apr. 10, 2011.*

(Continued)

*Primary Examiner* — James Zurita
(74) *Attorney, Agent, or Firm* — Glen R. Farbanish

(57) ABSTRACT

A request is received from a first consumer to sell at least one ticket, in which a provider of the ticket may have authorized the ticket to be sold. Information regarding the ticket may then be presented to at least a second consumer, who may make an indication to purchase the ticket. Thereafter, an inducement may be paid to the provider of the ticket in connection with a sale of the ticket to the second consumer.

27 Claims, 4 Drawing Sheets

(56) References Cited

U.S. PATENT DOCUMENTS

| | | | |
|---|---|---|---|
| 5,850,442 A | 12/1998 | Muftic | |
| 5,873,071 A | 2/1999 | Ferstenberg et al. | |
| 5,905,974 A | 5/1999 | Fraser et al. | |
| 5,905,975 A | 5/1999 | Ausubel | |
| 6,012,045 A | 1/2000 | Barzilai et al. | |
| 6,023,685 A * | 2/2000 | Brett et al. | 705/37 |
| 6,067,532 A * | 5/2000 | Gebb | 705/37 |
| 6,085,176 A | 7/2000 | Woolston | |
| 6,107,932 A * | 8/2000 | Walker et al. | 340/5.22 |
| 6,119,229 A | 9/2000 | Martinez et al. | |
| 6,134,534 A | 10/2000 | Walker et al. | |
| 6,151,588 A | 11/2000 | Tozzoli et al. | |
| 6,223,166 B1 | 4/2001 | Kay | |
| 6,233,565 B1 | 5/2001 | Lewis et al. | |
| 6,240,396 B1 * | 5/2001 | Walker et al. | 705/5 |
| 6,308,159 B1 | 10/2001 | Strohl | |
| 6,443,841 B1 | 9/2002 | Rossides | |
| 6,460,020 B1 | 10/2002 | Pool et al. | |
| 6,490,567 B1 | 12/2002 | Gregory | |
| 6,493,683 B1 | 12/2002 | David et al. | |
| 6,496,809 B1 | 12/2002 | Nakfoor | |
| 6,571,334 B1 | 5/2003 | Feldbau et al. | |
| 6,574,608 B1 | 6/2003 | Dahod et al. | |
| 6,704,713 B1 | 3/2004 | Brett | |
| 6,778,968 B1 | 8/2004 | Gulati | |
| 6,907,405 B2 | 6/2005 | Brett | |
| 7,330,826 B1 * | 2/2008 | Porat et al. | 705/26.3 |
| 7,451,109 B2 | 11/2008 | Seaman | |
| 2002/0082969 A1 | 6/2002 | O'Keeffe et al. | |
| 2003/0093306 A1 | 5/2003 | Onoyama | |
| 2003/0093387 A1 | 5/2003 | Nakfoor | |
| 2003/0236736 A1 | 12/2003 | Harmon et al. | |
| 2004/0006497 A1 | 1/2004 | Nestor et al. | |
| 2004/0111303 A1 | 6/2004 | Francis | |
| 2004/0153374 A1 | 8/2004 | Nelson | |
| 2004/0220821 A1 | 11/2004 | Ericsson et al. | |
| 2005/0021450 A1 | 1/2005 | Nakfoor | |
| 2005/0144115 A1 | 6/2005 | Brett | |
| 2005/0216547 A1 | 9/2005 | Foltz-Smith et al. | |
| 2006/0108418 A1 | 5/2006 | Rice | |

FOREIGN PATENT DOCUMENTS

| | | |
|---|---|---|
| JP | 2003-150740 | 5/2003 |
| WO | WO 01/41084 A2 | 6/2001 |
| WO | WO 01/59649 A1 | 8/2001 |
| WO | WO 01/71669 A2 | 9/2001 |
| WO | WO 03058559 A2 | 7/2003 |
| WO | WO 2004/001546 A2 | 12/2003 |
| WO | WO 2004070642 A1 | 8/2004 |

OTHER PUBLICATIONS

Notice of Allowance for U.S. Appl. No. 09/670,900; 7 pages; Jun. 8, 2009.

Fujimura, Ko, et. al. "General-purpose Digital Ticket Framework,"Proceedings of the 3rd USENIX Workshop on Electronic Commerce, Boston, Massachusetts, Aug. 31-Sep. 3, 1998.

Spindler, Zane, A., How 'parasites' serve their host: A graphical analysis of 'scalping', Public Finance Review, Nov. 1, 2003, col. 31, No. 6, p. 694.

Gregory, Sean, "Hot ticket: StubHub is trying to beat scalpers and brokers at their own game", Mar. 8, 2004, Time, vol. 163, No. 10, Time Bonus Section Apr. 2004; Inside Business/Entrepreneurs, p. A19.

Brian Grow, et. al., "Don'T Scalp Us. We'll Scalp You, Pro Teams once decried the ticket game. Now they're playing it—often on the Web", Business Week, Apr. 19, 2004, Section: News; Analysis & Commentary: Sportz Biz; No. 3879, p. 44.

Larry Karp, et. al., "When Promoters like Scalpers", Journal of Economics and Management Strategy, Jun. 1, 2005, vol. 14, No. 2, vol. 14, No. 2; 1 page.

"Business: Free-market fleecing: Ticket touting," Economist, Jan. 7, 2006, vol. 378, No. 8459, ISSN: 0013-0613; 1 page.

Blecher, J., "Barcodes: rock 'n' ticketd roll", Imaging Magazine, Feb. 1997, vol. 6, No. 2, pp. 34-35.

Evans, Jim, "On the Net, everyone can be a scalper—You can Auction off extra tickets to a Broadway Show or a Yankee Game on the web at a fat profit. Will Performers soon follow?", The Industry Standard, May 5, 1999, p. 28.

Website: Ticketmaster, (http://www.ticketmaster.com/ticketexchangehome/?tm_limk=tm_exchange_header), download date: Feb. 16, 2007; 2 pages.

Ethan Smith, et. al., "Hot Seat: To Protect its Box-Office Turf, Ticketmaster Plays Rivals' Tune," The Wall Street Journal, Sep. 12, 2006, Section: p. A1; 5 pages.

Seltzer, Richard, "Buying tickets for live events—What to do when you absolutely, positively want to be scalped", (www.samizdat.com), download date: Feb. 20, 2007; 4 pages.

U.S. PTO Office Action for U.S. Appl. No. 09/670,900; 10 pages; Aug. 22, 2008.

U.S. PTO Office Action for U.S. Appl. No. 09/670,900; 11 pages; Jun. 19, 2006.

U.S. PTO Office Action for U.S. Appl. No. 09/670,900; 9 pages; Apr. 13, 2004.

U.S. PTO Office Action for U.S. Appl. No. 09/670,900; 7 pages; Aug. 21, 2003.

U.S. Appl. No. 09/670,900; 19 pages; filed Sep. 28, 2000.

U.S. PTO Office Action for U.S. Appl. No. 09/670,900; 16 pages; Dec. 9, 2005.

"JAC, others set up Net auction firm", Nikkei Net Interactive, Mar. 22, 2000.

"LiquidSeats and eBay to Provide Users with a Wide Selection of Live Event Tickets; Highlights LiquidSeats' Leadership in Outsourced Solutions for Secondary Ticketing", PR Newswire, Mar. 5, 2002, Section: Financial News.

Ault, Susanne, "Third Eye Blind Auctions Tickets on eBay: Web Site Does Not Add Service Fees; Wants to Become an Established Retailer for Concert Seating", Billboard, May 24, 2003, vol. 115, No. 21, Section: Touring.

Orwall, Bruce, "Ticket Scalpers Find a Home on the Web", The Wall Street Journal, Feb. 4, 1999, p. B1.

Deckard, Linda, "Intix Meeting Focuses on Customers: Convention Investigates Ticket Resale Opportunities", Billboard, Feb. 9, 2002, vol. 114, No. 6, p. 8.

Munson, Lester, "Scalp Treatment? The Cubs Are Ticking Off Fans by 'Brokering' Tickets for Far Above Face Value", Sports Illustrated, Jun. 23, 2003, vol. 98, No. 25, Section: Scorecard, p. 22.

Swofford, James L., "A graphical analysis of 'scalping': A reply", Public Finance Review, Nov. 1, 2003, vol. 31, No. 6, p. 700.

U.S. Appl. No. 12/105,712, filed Apr. 18, 2008.

U.S. Appl. No. 11/680,680, filed Mar. 1, 2007.

U.S. Appl. No. 11/680,701, filed Mar. 1, 2007.

U.S. Appl. No. 12/105,712, filed Sep. 28, 2000.

U.S. PTO Office Action for U.S. Appl. No. 12/105,712 dated Nov. 23, 2010, 20 pages.

U.S. PTO Office Action for U.S. Appl. No. 11/680,680; 12 pages; Apr. 4, 2011.

U.S PTO Office Action for U.S. Appl. No. 11/680,701dated Apr. 27, 2011; 19 pages.

Laura Bly, "Hot bids: Are Internet auctions route to bargains?" [Metro Edition], San Antonio Express-News, San Antonio, Texas: May 9, 1999. p. 2L downloaded from ProQuestDirect on the Internet on Apr. 25, 2011; 4 pages.

U.S. PTO Office Action for U.S. Appl. No. 12/105,712 dated Jun. 9, 2011; 14 pages.

U.S PTO Office Action for U.S. Appl. No. 11/680,701dated Nov. 18, 2011; 14 pages.

U.S. PTO Office Action for U.S. Appl. No. 11/680,680; 16 pages; Nov. 1, 2011.

U.S. PTO Office Action for U.S. Appl. No. 12/105,712; 17 pages; Mar. 27, 2012.

U.S. PTO Office Action for U.S. Appl. No. 12/105,712; 17 pages; Oct. 17, 2012.

U.S. PTO Advisory Action for U.S. Appl. No. 11/680,680; 2 pages; Jun. 13, 2012.

(56) References Cited

OTHER PUBLICATIONS

U.S. PTO Office Action for U.S. Appl. No. 11/680,680; 2 pages; Feb. 11, 2013.
U.S. PTO Advisory Action for U.S. Appl. No. 11/680,701; 2 pages; May 31, 2012.
U.S. PTO Office Action for U.S. Appl. No. 11/680,701; 16 pages; Jul. 27, 2012.

U.S. PTO Notice of Allowance for U.S. Appl. No. 12/105,712; 8 pages; May 6, 2013.

U.S. PTO Notice of Allowance for U.S. Appl. No. 11/680,680; 12 pages; Sep. 25, 2013.

U.S. PTO Notice of Allowance for U.S. Appl. No. 11/680,701; 13 pages; Sep. 25, 2013.

* cited by examiner

TRANSFERRING AN ITEM

CROSS REFERENCE TO RELATED APPLICATIONS

This application is a continuation of co-pending U.S. patent application Ser. No. 09/670,900, filed Sep. 28, 2000 now U.S. Pat. No. 7,574,375, entitled SYSTEMS AND METHODS FOR TRANSFERRING ITEMS WITH RESTRICTED TRANSFERABILITY by Stuart A. Fraser, Philip M. Ginsberg, Glenn D. Kirwin, and Howard W. Lutnick, which claims the benefit of U.S. Provisional Application No. 60/156,474, filed Sep. 28, 1999, entitled SYSTEMS AND METHODS FOR TRANSFERRING ITEMS WITH RESTRICTED TRANSFERABILITY by Stuart A. Fraser, Philip M. Ginsberg, Glenn D. Kirwin, and Howard W. Lutnick, both of which are hereby incorporated by reference herein in there entirety.

BACKGROUND OF THE INVENTION

The present invention is systems and methods for transferring items with restricted transferability, such as airline tickets, concert tickets, sporting event tickets, hotel reservations, etc. More particularly, the present invention relates to systems and methods for enabling consumers to exchange perishable items with the assistance from the providers of the items.

Many popular high-cost and yet perishable items, such as airline tickets, concert tickets, and sporting event tickets, are sold by providers to consumers with restrictions on the transferability of those items. For example, with items such as airline tickets, an airline (i.e., a provider) may sell an airline ticket to a first passenger (i.e., a consumer) twenty-one days in advance of the corresponding flight at a heavily discounted fare. In such a case, the airline would likely place restrictions on the transferability of the airline ticket in order to prevent the first passenger from selling the airline ticket to a second passenger a few days before the corresponding flight at less than what the airline would charge the second passenger for the same ticket at that time. The airline prevents such a transfer in order to prevent the first passenger from competing with the airline for the sale of the airline ticket to the second passenger.

Such restrictions on transferability may greatly burden a consumer when, for reasons beyond the consumer's control, the consumer is forced to forgo the benefit of the perishable item. For example, a consumer who purchased non-transferable and non-refundable airline tickets may be forced to lose the value of those tickets when the consumer is unable to make the corresponding flight due to unforeseeable business or personal obligations, or any other suitable reason.

Accordingly, it is desirable to provide systems and methods for transferring perishable items with restrictions on transferability.

SUMMARY OF THE INVENTION

It is therefore an object of the present invention to provide systems and methods which allow consumers to transfer items with restricted transferability to other consumers.

This and other objects of the present invention are accomplished in accordance with the principles of the invention by providing systems and methods which enable consumers to transfer goods and services with restricted transferability. Initially, these systems and methods wait for a first consumer to make a request to transfer an item (such as an airline ticket) after having purchased the item (directly or indirectly) from a provider (such as an airline). Once the request is received, the systems and methods then compose and send a request to transfer the item to the provider. This request may indicate inducements to the provider that will be granted in exchange for the provider authorizing a transfer. If the transfer is authorized, the systems and methods then present information regarding the item to other consumers, including a second consumer. This information may be presented as part of a bidding interface or as part of an advertising interface. Once the second consumer submits a winning bid for the item when the information is presented in a bidding interface, or an acceptable offer when the information is presented in an advertising interface, the transfer of the item can then be completed with or without the assistance of an intermediary (that may also be a provider of the systems and methods of the present invention). When the transfer is completed without the assistance of an intermediary, the first and second consumer may directly transfer the item and payment to each other. When the transfer is completed with the assistance of an intermediary, the first consumer may send the item to the intermediary and the second consumer may send payment to the intermediary. Once both the item and the payment have been received at the intermediary, the intermediary may send the item to the second consumer and all of the payment (or part of the payment when commission payments are made) to the first consumer.

Although the present invention is illustrated in connection with airline tickets, the invention is equally applicable to other types of items, such as concert tickets, sporting event tickets, option contract rights, systems for which a non-refundable deposit has been paid (e.g., hotel rooms, car rentals, and restaurant reservations), etc.

BRIEF DESCRIPTION OF THE DRAWINGS

Further features of the invention, its nature and numerous advantages will be more apparent from the following detailed description of the preferred embodiments, taken in conjunction with the accompanying drawings, in which like reference characters refer to like parts throughout, and in which.

DETAILED DESCRIPTION OF THE PREFERRED EMBODIMENTS

The present invention is now described in connection with FIGS. 1-4.

Figure 1:
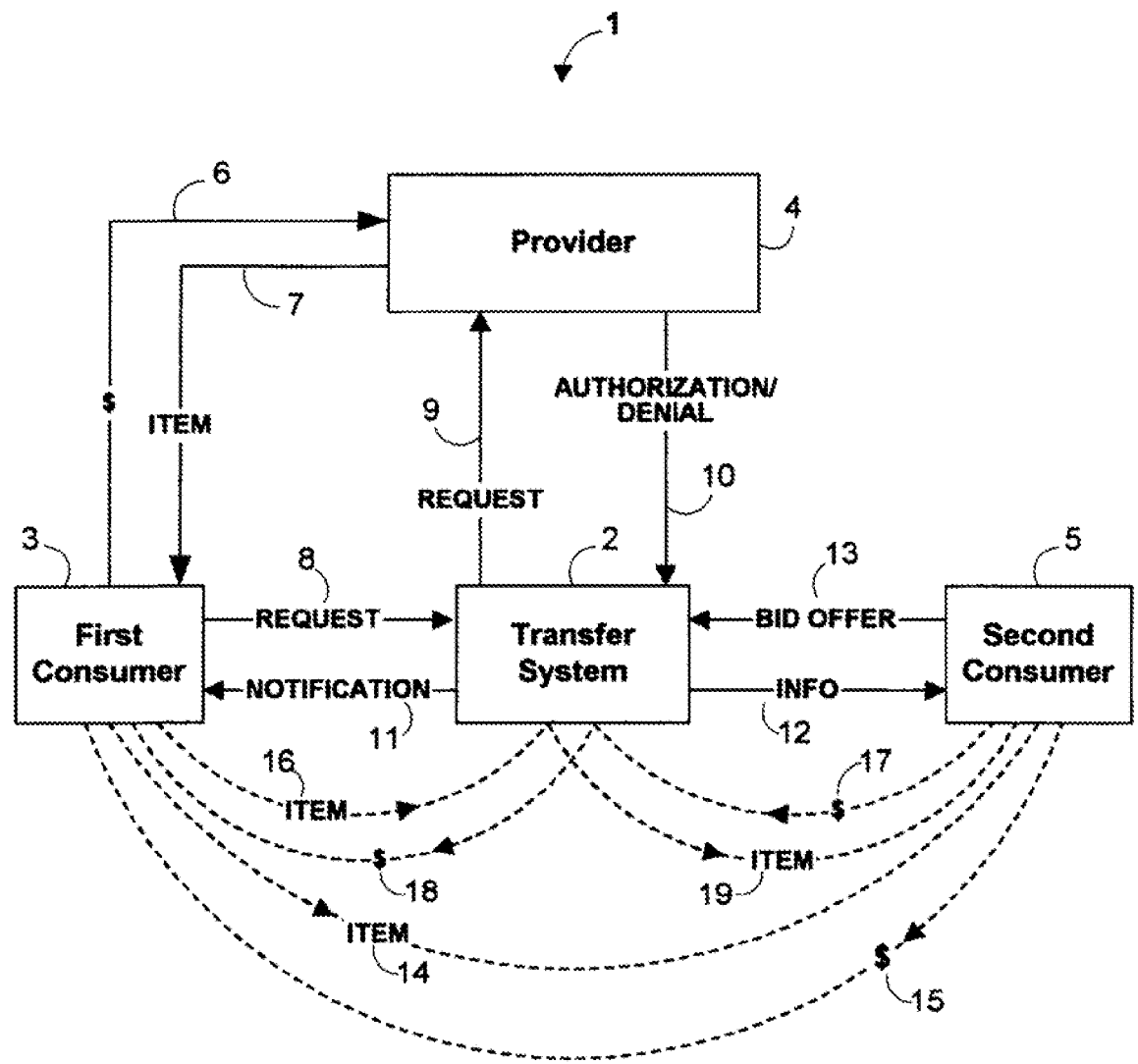
FIG. 1 is a transaction flow diagram of one embodiment of the systems and methods of the present invention.

Turning first to FIG. 1, an example of a transaction flow 1 of one embodiment of the systems and methods of the present invention is illustrated. As shown, a first consumer 3 may purchase an item at steps 6 and 7 by, for example, providing a provider 4 with a payment (step 6) and provider 4 providing first consumer 3 with an item (e.g., goods or services) (step 7). At any point after first consumer 3 purchases the item at steps 6 and 7, first consumer 3 may submit a request at step 8 to a transfer system 2 to transfer the item.

When a transfer is requested, system 2 may prompt first consumer 3 for the desired conditions for the transfer. For example, system 2 may prompt first consumer 3 as to whether first consumer 3 would like to auction the item or simply post an advertisement for the item. System 2 may also prompt first consumer 3 for additional selling information, such as a minimum sale price for the item, or any other suitable information, or any combination thereof. Alternatively, this information may be submitted as part of the request.

Transfer system 2 may then request that provider 4 authorize a transfer of the item at step 9. System 2 may also ask provider 4 to verify that first consumer 3 is in fact in possession of the item.

When requesting authorization at step 9, system 2 may indicate an inducement to provider 4 that may be granted in exchange for the provider granting authorization to transfer the item. For example, a flat fee (such as $50) may be paid to the provider system in order to release the restriction on transferability. As another example, a percentage fee (such as 10% of the transfer price) may be paid to the provider system. As yet another example, the fee paid may be higher when the provider system is also trying to sell similar items to other consumers (e.g., when a corresponding flight is not sold out) and lower otherwise. As still another example, the provider system may place additional restrictions on the transfer, such as a minimum transfer price, a maximum number of items that may be sold, or any other suitable restriction, or any suitable combination thereof. As a further example, the provider system may be given the option of buying back the item at an agreed upon price. Any other suitable approach may also be used. At step 10, system 2 may then receive an authorization or denial for the transfer. This authorization or denial may then be communicated to first consumer 3 at step 11.

Figure 2:
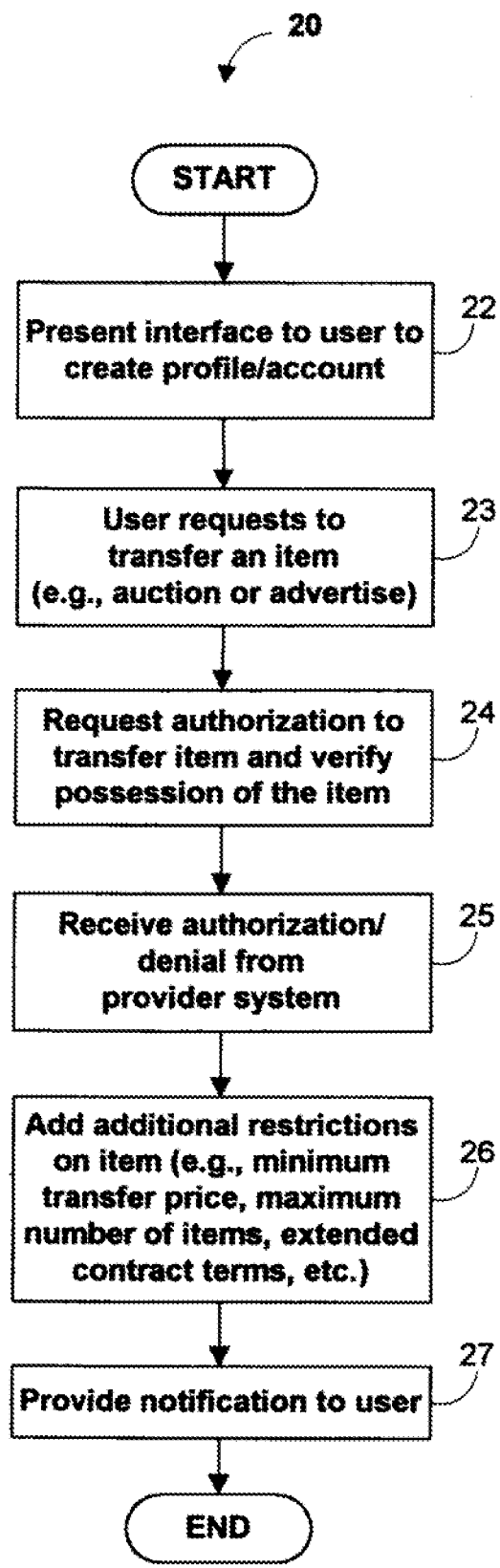
FIG. 2 is a flow diagram of a process for contacting a provider and providing notification to a consumer in accordance with one embodiment of the present invention.

Referring to FIG. 2, an example of a process 20 for performing steps 8-11 of FIG. 1 is illustrated. As shown in FIG. 2, an interface may be presented at step 22 to consumer 3 that allows the consumer to create a consumer profile. The interface may, for example, prompt the consumer for his/her full name, address(es), telephone number(s), e-mail address(es), credit card information, and any other information suitable for use by transfer system 2. This profile may then be stored in a database in system 2.

Upon creating the profile, consumer 3 may then request to transfer an item with restricted transferability at step 23. The consumer may request to transfer the item by auctioning or posting an advertisement for the item. Once consumer 3 has requested to transfer the item, system 2 may contact provider 4 to request authorization to transfer the item at step 24. System 2 may use information in the consumer profile in requesting authorization. System 2 may also verify with provider 4 that consumer 3 is in fact in possession of the item. For example, system 2 may query provider 4 for information on whether consumer 3 possesses the item. Alternatively, system 2 may request that consumer 3 provide any additional information on the item, such as a serial number, to verify possession.

In response to the request made at step 24, provider 4 may authorize or deny the requested transfer at step 25. This authorization or denial may be provided via e-mail, telephone, printed mail, or any other suitable method. At step 26, when an authorization is granted, provider 4 may add any additional restrictions on transfer of the item, such as a minimum transfer price, a maximum number of items, additional contract terms, or any other suitable restriction, or any suitable combination thereof. Finally, at step 27, system 2 may then notify consumer 3 whether the requested transfer was authorized and what additional restrictions, if any, have been imposed. The system may, for example, relay the provider's decision to the consumer by sending an e-mail, pop-up message, printed message (which is mailed to the consumer), or any other suitable printed or electronic notification.

Turning back to FIG. 1, if the request to transfer the item is authorized, system 2 may then present information to consumers, including a second consumer 5, at step 12. Information may be provided in the form of an advertisement or as part of an auction system. In response to this information, a second consumer 5 may indicate a willingness to receive the item via an auction or in response to a posted advertisement, for example. Once a second consumer 5 has been found, the participation of system 2 in the transfer may be complete and consumers 3 and 5 may close the transfer through steps 14 and 15. As illustrated, closing the sale may include second consumer 5 sending money to first consumer 3 at step 15 and first consumer 3 sending the item to second consumer 5 at step 14.

Alternatively, system 2 may assist in closing the transfer on behalf of consumers 3 and 5. For example, system 2 may notify provider 4 of the transfer so that the provider 4 may void-out the item possessed by first consumer 3, and issue a new item to second consumer 5. As another example, system 2 may instruct second consumer 5 to send a payment to system 2 at step 17 and instruct first consumer 3 to send the item to system 2 at step 16, after which system 2 will send the payment to first consumer 3 at step 18 and the item to second consumer 5 at step 19. In this capacity, system 2 may act as an intermediary or may use an external intermediary.

System 2 may charge a service fee for providing this service. This fee may be paid by first consumer 3, second consumer 5, and/or provider 4. The fee may be subtracted from the payment made at step 17, for example. Alternatively, a payment could be made from first consumer 3 at the time of submitting the request at step 8.

In order to verify the authenticity of first consumer 3 and second consumer 5, and to insure performance of their obligations, each consumer may be prompted by system 2 to enter suitable information such as a name, an address, a telephone number, a credit card number, a social security number, or any other suitable information, or any combination thereof, at any time.

Figure 3:
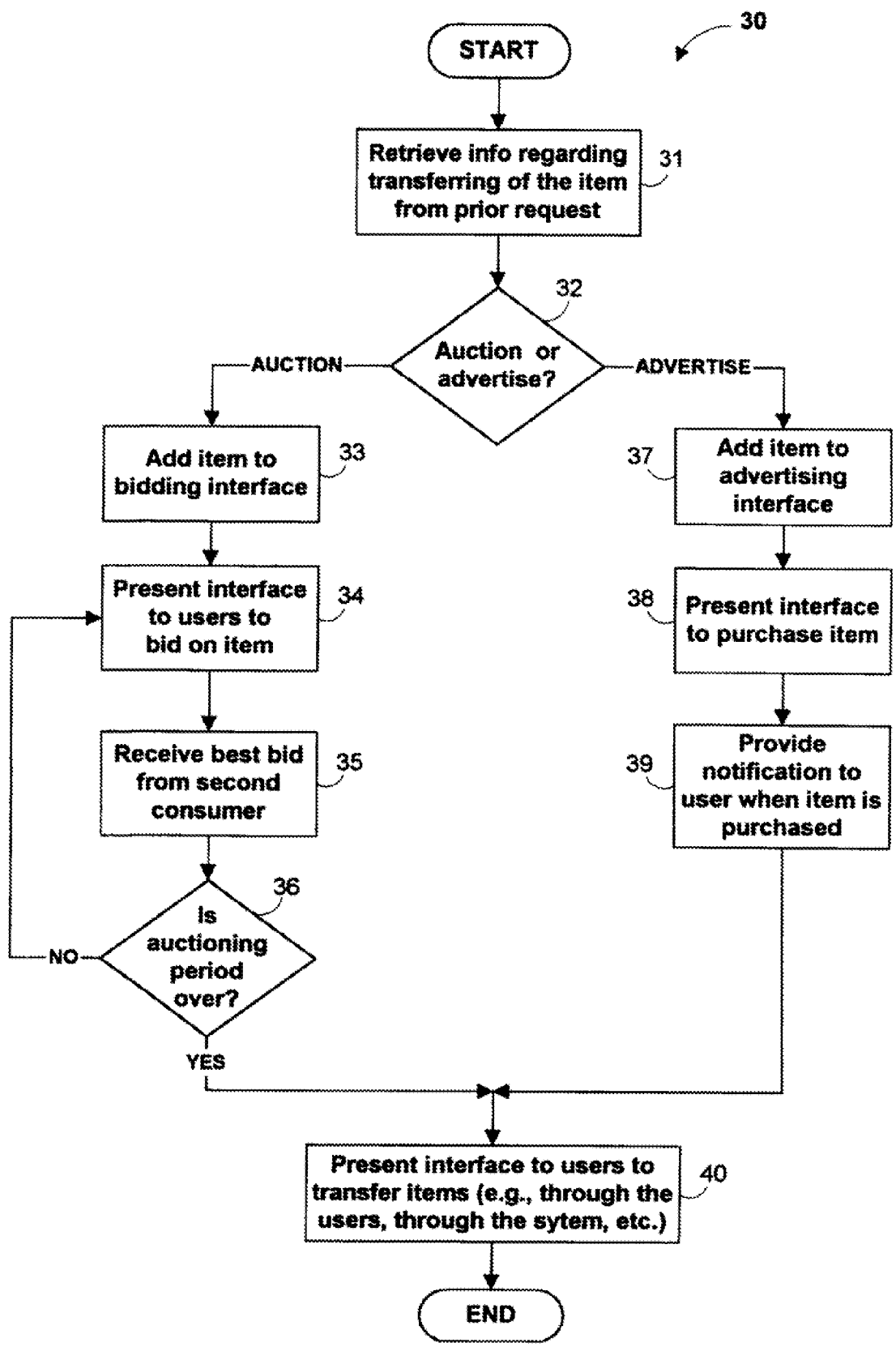
FIG. 3 is a flow diagram of a process for trading and transferring an item between consumers in accordance with one embodiment of the present invention.

Turning to FIG. 3, an example of a process 30 for performing steps 12-15 of FIG. 1 is illustrated. As shown at step 31, system 2 may retrieve request information regarding transferring of the item that was previously submitted by first consumer 3 (e.g., asking price, item description, bidding duration, whether to auction or advertise the item, etc.). In one suitable approach, first consumer 3 may decide to post an advertisement and accept the first bid when, for example, the consumer possesses an item which expires in a few days. In another suitable approach, the consumer may decide to auction an item when, for example, the consumer desires to obtain the best possible offer gained through bidding competition.

At step 32, system 2 uses this information to determine whether first consumer 3 wants to advertise or auction the item. When the consumer desires to auction the item, the system may add the item to a bidding interface at step 33. At step 34, second consumer 5 may be presented with this interface in order to enable that consumer to place a bid on the item.

This interface preferably facilitates the consumer inputting bidding information at step 35. Bidding information may include the consumer's name, billing address, shipping address, bid, and/or any other suitable information. At step 36, the system may then determine if the auctioning period is over. If the auctioning period is not over, process 30 may loop back to step 34 and allow additional bids to be placed. In this example, system 2 will provide the item to the consumer with the best bid placed at step 34 prior to the end of a bidding period. The bidding period may be determined by consumer 3 or system 2 and may be for some period of time after a first bid is received or until at least one bid is received after at least a minimum period of time.

If it is determined at step 32 that consumer 3 decided to post an advertisement at step 32, however, system 2 may then add the item to an advertising interface at step 37. Second consumer 5 may be presented with this interface in order to facilitate offering to buy the item at step 38. When second consumer 5 offers to buy the item, system 2 may provide a notification to first consumer 3 at step 39. For example, system 2 may provide the item to second consumer 5 when his offer matches the criteria of the request information. For example, the given offer must be greater than or equal to an asking price.

Once system 2 has received an acceptable offer at step 39 or after the auctioning period has lapsed at step 36, system 2 may provide consumers 3 and 5 with options relating to transferring the item at step 40. For example, the system may allow each consumer to send their respective item or payment to system 2. In this approach, system 2 preferably handles the processing and may charge each consumer with a handling fee. In another suitable approach, system 2 may allow consumers 3 and 5 to send the item and payment directly to each other without intervention from system 2. Yet another suitable approach, system 2 may notify provider 4 of a transfer between consumers 3 and 5. In such a case, system 2 may require provider 4, for example, to reissue tickets, reservations, or any other item to second consumer 5, and void the original item. Provider 4 may request additional information from each consumer 3 and 5, such as name, address(es), phone number(s), etc., in order to complete the transfer of items. Any other suitable approach for transferring items may also be used.

Figure 4:
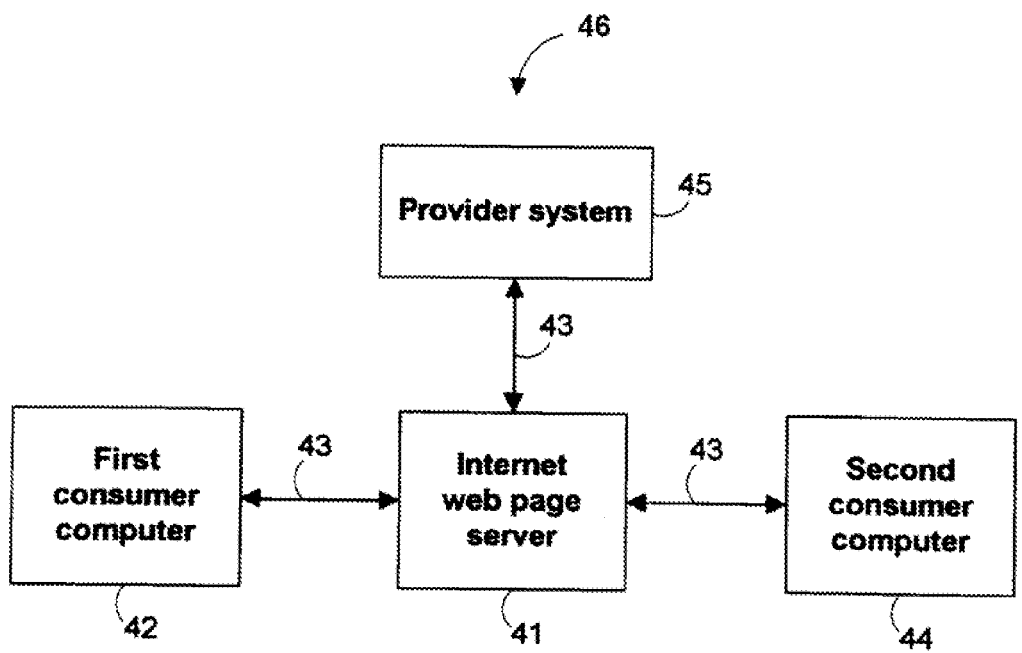
FIG. 4 is a block diagram of one embodiment of hardware that may be used to implement the present invention.

The systems and methods of the present invention may be implemented using any suitable communication network. One embodiment of such a communication network 46 is shown in FIG. 4. As illustrated, transfer system 2 may be implemented as a web site that is hosted on an Internet web page server 41, which may be any suitable server. A provider system 45, a first consumer computer 42, and a second consumer computer 44 may be connected to Internet web page server 41, or any other suitable server, through any suitable Internet connections 43.

Internet web page server 41 may be any server suitable for providing access to a web site operating as system 2. Internet web page server 41 may, for example, provide one or more web pages to first consumer computer 42 and second consumer computer 44 using one or more suitable protocols (e.g., the HyperText Transfer Protocol (HTTP) and Transmission Control Protocol/Internet Protocol (TCP/IP)). The server may also run a database engine suitable for maintaining a database of consumer and item information. In practice, one or more functions of first consumer computer 42, second consumer computer 44, and the Internet web page server 41 may be integrated into a single server, or may be distributed across multiple servers.

Any suitable Internet connections 43 may be used in communication network 46 in accordance with the present invention. For example, Internet connections 43 may be comprised in whole or in part of the Internet, an intranet, a public data network, a private data network, a wireless network, a cable network, any other suitable data network or combination of networks, dial-up connections, etc.

Thus, systems and methods for transferring items with restricted transferability are provided. It will be understood that the foregoing is only illustrative of the principles of the invention and that various modifications can be made by those skilled in the art without departing from the scope and spirit of the invention, which is limited only by the claims that follow.

What is claimed is:

1. A method provided by an intermediary for selling tickets between consumers, the method comprising:
   receiving by at least one computing device from a first consumer a request to sell a ticket,
      in which the first consumer purchased the ticket directly from a provider of the ticket or purchased the ticket indirectly from the provider of the ticket, and
      in which the provider placed on the ticket at least one restriction on transferability;
   receiving by the at least one computing device from a second consumer an indication to purchase the ticket; and
   based at least in part on the provider having authorized for the ticket a transfer that is contrary to the at least one restriction on transferability:
      charging by the at least one computing device at least one of the first consumer and the second consumer a service fee in connection with a sale of the ticket from the first consumer to the second consumer; and
      causing by the at least one computing device the ticket to be transferred from the first consumer to the second consumer,
         wherein the service fee is retained by the intermediary, and
         wherein the provider of the ticket is paid an inducement in connection with the sale of the ticket from the first consumer to the second consumer.

2. The method of claim 1, in which receiving from a second consumer an indication to purchase the ticket comprises receiving from the second consumer an offer to buy the ticket.

3. The method of claim 1, in which receiving from a second consumer an indication to purchase the ticket comprises receiving from the second consumer a bid for the ticket.

4. The method of claim 1, further comprising causing information regarding the ticket to be presented to at least the second consumer.

5. The method of claim 4, in which causing information regarding the ticket to be presented comprises advertising the ticket at a price.

6. The method of claim 5, in which the first consumer specifies the price.

7. The method of claim 4, in which causing information regarding the ticket to be presented comprises holding an auction for the ticket and presenting information regarding the ticket through the auction.

8. The method of claim 1, in which the inducement comprises a percentage of a sale price at which the ticket is sold from the first consumer to the second consumer.

9. The method of claim 1, in which the inducement comprises a flat fee.

10. The method of claim 1, further comprising verifying the first consumer is in possession of the ticket.

11. The method of claim 1, further comprising receiving from the first consumer a serial number of the ticket.

12. The method of claim 1, in which causing the ticket to be transferred comprises causing the first consumer to send the ticket to the intermediary.

13. The method of claim 1, in which causing the ticket to be transferred comprises at least one of:
   issuing a new ticket to the second consumer; and
   causing a new ticket to be issued to the second consumer.

14. The method of claim 1, in which causing the ticket to be transferred comprises at least one of:
voiding the ticket; and
causing the ticket to be voided.

15. The method of claim 1, in which causing the ticket to be transferred comprises at least one of:
sending the ticket to the second consumer; and
causing the ticket to be sent to the second consumer.

16. The method of claim 1, in which causing the ticket to be transferred comprises causing the first consumer to send the ticket to the second consumer.

17. The method of claim 1, in which the at least one restriction on transferability comprises the ticket being non-transferable.

18. The method of claim 17, further comprising causing the first consumer to be notified that the provider has authorized the ticket to be transferred.

19. The method of claim 1, in which the at least one restriction on transferability comprises a restriction on a price at which the first consumer may resell the ticket.

20. The method of claim 1, in which the provider of the ticket is paid the inducement in exchange for the provider authorizing for the ticket the transfer that is contrary to the at least one restriction on transferability.

21. An apparatus of an intermediary for selling tickets between consumers, the apparatus comprising at least one computing device comprising a non-transitory memory having a program stored thereon that when executed by the at least one computing device directs the at least one computing device to:
receive from a first consumer a request to sell a ticket,
in which the first consumer purchased the ticket directly from a provider of the ticket or purchased the ticket indirectly from the provider of the ticket and
in which the provider placed on the ticket at least one restriction on transferability;
receive from a second consumer an indication to purchase the ticket; and
based at least in part on the provider having authorized for the ticket a transfer that is contrary to the at least one restriction on transferability:
charge at least one of the first consumer and the second consumer a service fee in connection with a sale of the ticket from the first consumer to the second consumer; and
causing the ticket to be transferred from the first consumer to the second consumer,
wherein the service fee is retained by the intermediary, and
wherein the provider of the ticket is paid an inducement in connection with the sale of the ticket from the first consumer to the second consumer.

22. The apparatus of claim 21, in which the inducement comprises a percentage of a sale price at which the ticket is sold from the first consumer to the second consumer.

23. The apparatus of claim 21, in which the inducement comprises a flat fee.

24. The apparatus of claim 21, in which the at least one restriction on transferability comprises the ticket being non-transferable.

25. The apparatus of claim 24, in which the program, when executed by the at least one computing device, further directs the at least one computing device to cause the first consumer to be notified that the provider has authorized the ticket to be transferred.

26. The apparatus of claim 21, in which the at least one restriction on transferability comprises a restriction on a price at which the first consumer may resell the ticket.

27. The apparatus of claim 21, in which the provider of the ticket is paid the inducement in exchange for the provider authorizing for the ticket the transfer that is contrary to the at least one restriction on transferability.

* * * * *